W. L. Gold,
Steam Cut-Off.
Nº 26,901. Patented Jan. 24, 1860.
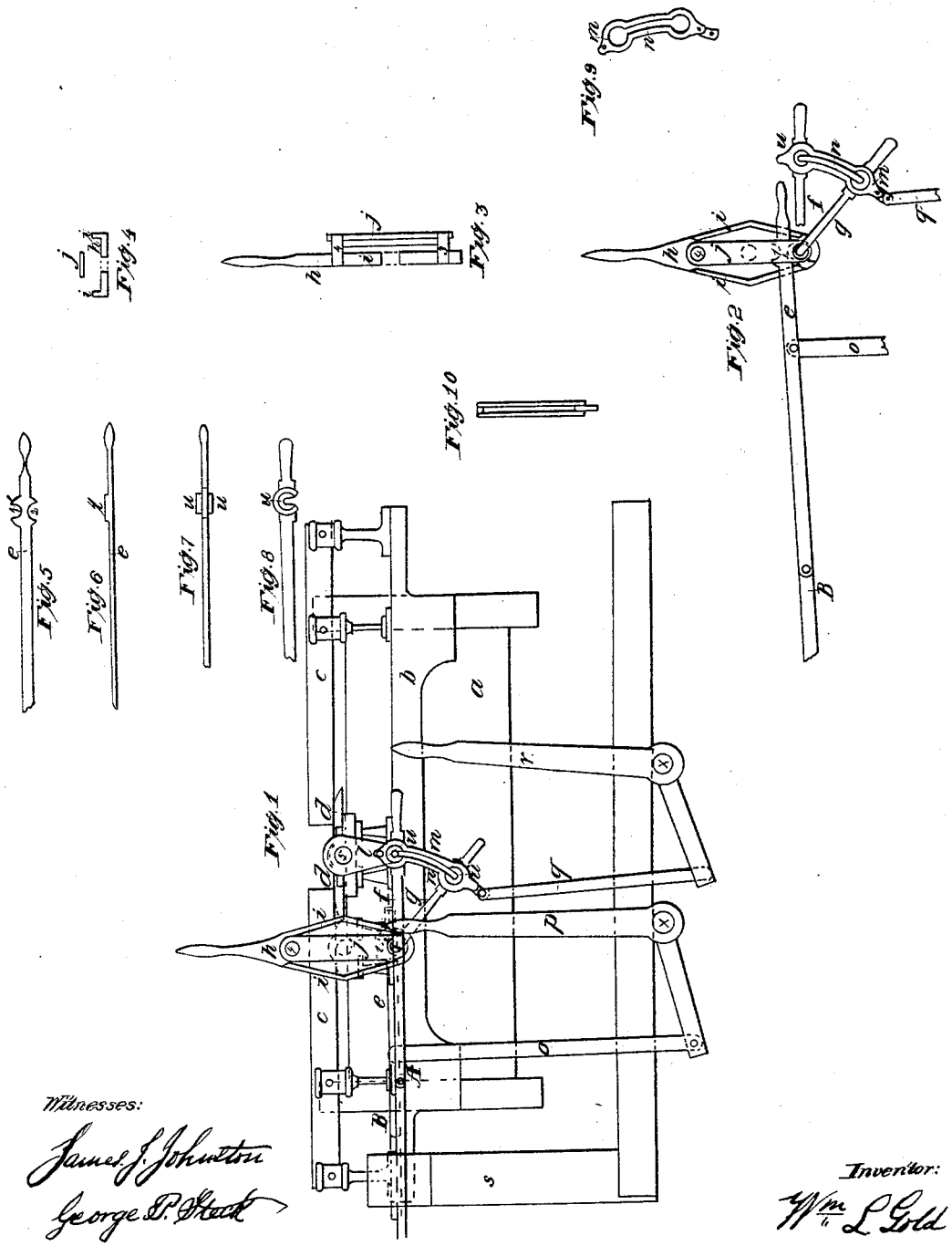
Witnesses:
James J. Johnston
George P. Steck
Inventor:
Wm L Gold

UNITED STATES PATENT OFFICE.

WILLIAM L. GOLD, OF ALLEGHENY CITY, PENNSYLVANIA.

STEAM-ENGINE.

Specification of Letters Patent No. 26,901, dated January 24, 1860.

*To all whom it may concern:*

Be it known that I, WILLIAM L. GOLD, of the city and county of Allegheny, in the State of Pennsylvania, have invented a new and Improved Mode of Operating and Handling Steam-Engines; and I do hereby declare that the following is a full and exact description thereof, reference being had to the accompanying drawings and to the letters of reference marked thereon.

The nature of my invention consists in so arranging and constructing the cranks or arms of the lifters and cam rods of puppet valve engines, that they may be operated and handled with ease and speed by means of levers and connecting rods, the whole being arranged and constructed in the manner hereinafter described.

To enable others skilled in the art to make and use my invention, I will proceed to describe its construction and operation.

In the accompanying drawings, Figure 1, is a face and sectional view of my improvement and represents one half of a cylinder of a puppet valve engine on the "receiving side." Fig. 2, is a face view of the reversing crank or arm, and also represents a sectional view of the cam and connecting rods. Figs. 3 and 4, are cut or sectional views of the reversing crank or arm. Fig. 5, is a face and Fig. 6 is a top view of the cam rod which is used in connection with the reversing crank or arm. Fig. 7, is a top and Fig. 8, is a side view of the cam rods used for changing from cut off to full stroke of steam. Fig. 9, is a face and Fig. 10, is an edge view of the link which is used for changing the cam rods from a cut off to a full stroke of steam.

The engine, with valves, levers, lifters and the cross shafts to which the lifters are attached, are all constructed and arranged in the usual manner, but the reversing arm and cam rods are constructed and arranged as hereinafter described.

($a$) is the cylinder of the engine.
($b$) is the side pipe.
($c$) is the lever for operating the valves.
($d$) are the lifters which operate the levers ($c$). The lifters ($d$) are attached to a cross shaft marked (5).
($e$) is the cam rod which is used for reversing the engine and is used in connection with the reversing arm ($h$), which is furnished with flanges ($i$), wrists (3 and 4), and guide plate ($j$). The cam rod ($e$) is furnished with two hooks marked (1 and 2), and a projection on the inner side marked ($r$) see Figs. (5 and 6); this projection ($r$) in connection with the flanges ($i$) on the reversing arm ($h$), will guide the hooks (1 and 2) of the cam rod ($e$), to their proper and desired position on the wrists (3 and 4). The cam rod ($e$) has a hinge joint at (B).

To the cam rod ($e$) is attached a rod ($o$) which is attached to the lever ($p$) which is secured to the shaft ($x^1$). By this arrangement of the shaft ($x^1$), lever ($p$), and rod ($o$), cam rod ($e$), and reversing arm ($h$), (which is attached to the cross shaft to which the lifters are attached which operate the levers of the exhaust valves) a reverse or forward motion of the engine may be obtained, by simply moving the lever ($p$) back or forward, which will move the hooks of the cam rod ($e$) on to the wrists (3 or 4). When reversing the engine the cam rod ($g$), should be raised up, so as to operate the crank or arm ($l$).

The cam rods ($f$ and $g$), are attached to the link ($m$) which should be made in the form represented in Figs. 9 and 10. The cam rods ($f$ and $g$) should be made in the form represented in Figs. 7 and 8, and secured in the link ($m$) as represented in Fig. 2. It will be observed that the cam rod ($g$) is attached to wrist (3) of the receiving arm ($h$). The cams which operate the cam rods ($e$ and $f$) are always placed on the crank shaft to which the pitman of the engine is attached. The cam rod ($f$) is furnished with a hinge joint at (A). The link ($m$) is furnished with a slot ($n$) which is made to fit the wrist of the crank or arm ($l$); and is attached to the rod ($q$) which is attached to the lever ($r$) on shaft ($x$). By the arrangement of the link ($m$), cam rods ($f$ and $g$), rod ($q$) and lever ($r$), in connection with the crank or arm ($l$), the cut off cam rod ($g$), which gives a full stroke of steam may be thrown into gear, by simply moving lever ($r$). By suitably arranging arms projecting from the shafts ($x^1$ and $x$), and attaching rods to the cam rods and said projections; as represented in Fig. 1, of the accompanying drawings, two engines may be placed under the control of one engineer.

The operation of my improvement is as follows: when the various parts are in the position represented in Fig. 1, of the accompanying drawings, the engine will be working forward with cut off cam. When the cam rod (*f*), is thrown out of gear, and the short cam rod (*g*) thrown into gear, the engine will be working forward with a full stroke of steam. When the short cam rod (*g*) is in gear, and the cam rod (*e*) is raised up so as to bring the hook (1) into gear on the wrist (4) of the reversing arm (*h*), the engine will be working backward with a full stroke of steam. All of these various operations of the engine are accomplished by moving the levers (*p* and *r*), back or forward in accordance with the action desired of the engine.

Having thus described the nature, construction, and operation of my improvement, what I claim as of my invention, and desire to secure by Letters Patent of the United States, is—

1. The flanges (*i*), on the reversing crank or arm (*h*), and the projection (*r*) on the cam rod (*e*), when used for the purpose of guiding the hooks (1 and 2), into their proper position on the wrists (3 and 4) of the reversing crank or arm (*h*), as herein described and set forth.

2. The use of the link (*m*) or its equivalent, when used in connection with the cam rods (*f* and *g*), reversing crank or arm (*h*), and the crank or arm (*l*), as herein described and for the purpose set forth.

3. The use of the connecting rods (*o* and *g*) or their equivalents, when used in combination with the link (*m*), cam rod (*e*), and levers (*p* and *r*), as herein described and for the purpose set forth.

WM. L. GOLD.

Witnesses:
JAMES J. JOHNSTON,
GEORGE P. STECK.